United States Patent
Petrovic et al.

(10) Patent No.: US 9,787,087 B2
(45) Date of Patent: Oct. 10, 2017

(54) SYSTEMS AND METHODS FOR DISCHARGING AN INPUT CAPACITANCE

(71) Applicant: SCHNEIDER ELECTRIC IT CORPORATION, West Kingston, RI (US)

(72) Inventors: Luka Petrovic, Billerica, MA (US); Kenneth A. Colby, Jr., Hollis, NH (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 275 days.

(21) Appl. No.: 14/655,095

(22) PCT Filed: Dec. 24, 2012

(86) PCT No.: PCT/US2012/071573
§ 371 (c)(1),
(2) Date: Jun. 24, 2015

(87) PCT Pub. No.: WO2014/105005
PCT Pub. Date: Jul. 3, 2014

(65) Prior Publication Data
US 2015/0333507 A1    Nov. 19, 2015

(51) Int. Cl.
*H02H 9/04* (2006.01)
*H02M 1/12* (2006.01)
*H02M 1/32* (2007.01)

(52) U.S. Cl.
CPC ............. *H02H 9/04* (2013.01); *H02M 1/126* (2013.01); *H02M 2001/322* (2013.01)

(58) Field of Classification Search
CPC .................................. H02H 9/04; H02H 9/041
USPC ........................................................... 361/56
See application file for complete search history.

(56) References Cited

U.S. PATENT DOCUMENTS

| | | | |
|---|---|---|---|
| 4,275,436 A | 6/1981 | Peterson | |
| 5,513,088 A * | 4/1996 | Williamson | H02M 3/335 363/21.15 |
| 6,096,934 A * | 8/2000 | Rekoske | C07C 1/02 585/316 |
| 6,906,934 B2 | 6/2005 | Yang et al. | |

(Continued)

OTHER PUBLICATIONS

International Search Report and Written Opinion from corresponding PCT Application Serial No. PCT/US2012/071573, dated Mar. 8, 2013.

*Primary Examiner* — Dharti Patel
(74) *Attorney, Agent, or Firm* — Lando & Anastasi, LLP

(57) ABSTRACT

An electronic device including first and second line inputs, first and second device inputs, a filter circuit, and a switching circuit. The filter circuit has a first input electrically coupled to the first line input, a second input electrically coupled to the second line input, a first output electrically coupled to the first device input, a second output, and at least one capacitor electrically coupling at least one of the first input to the second input or the first output to the second output. The switching circuit has a control input to receive a control signal, and electrically couples the second output to the second device input in response to the control signal having the first state and electrically couples the second output to one of the first input and the first output through a resistor in response to the control signal having the second state.

21 Claims, 11 Drawing Sheets

(56) References Cited

U.S. PATENT DOCUMENTS

| | | | |
|---|---|---|---|
| 7,274,112 B2 | 9/2007 | Hjort et al. | |
| 2012/0020131 A1* | 1/2012 | Chan | H02J 9/005 363/126 |
| 2012/0262140 A1* | 10/2012 | Divan | H02M 3/156 323/282 |

* cited by examiner

SYSTEMS AND METHODS FOR DISCHARGING AN INPUT CAPACITANCE

CROSS-REFERENCE TO RELATED APPLICATIONS

This application is a U.S. National Stage Application under 35 U.S.C. §371 of International Application No. PCT/US2012/071573, filed Dec. 24, 2012, which is hereby incorporated herein by reference in its entirety.

BACKGROUND OF THE INVENTION

Field of the Invention

Embodiments of the present invention are generally directed to systems and methods of dissipating energy stored in an electronic device in response to disconnection of the electronic device, and more particularly to systems and methods of dissipating energy stored in an electronic device, such as an uninterruptable power supply (UPS), that dissipate little or no energy during operation of the electronic device.

Discussion of Related Art

The vast majority of electronic devices typically include some sort of input filtering to filter the input power received by the electronic device from electro magnetic interference (EMI), to filter line inputs of an electronic device from EMI generated by the electronic device, or both. Generally, such input EMI filtering includes some combination of one or more capacitors electrically coupled between a power input terminal and a neutral input terminal of the electrical device, between power input terminals of the electronic device receiving different phases of power, or between a power input terminal and ground. Various regulatory standards promulgated by standards bodies and associations, such as Underwriters Laboratories (UL), the Canadian Standards Association (CSA), etc. require that when the input cord of an electronic device is disconnected from a power source, the voltage available on the input pins of the input cord must drop below a particular energy level within a certain amount of time.

SUMMARY OF THE INVENTION

In accordance with an aspect of the present invention, an electronic device is provided. The electronic device comprises a first line input and a second line input, a first device input and a second device input, a filter circuit, and a switching circuit. The filter circuit has a first input electrically coupled to the first line input, a second input electrically coupled to the second line input, a first output electrically coupled to the first device input, and a second output. The filter circuit includes at least one capacitor electrically coupling at least one of the first input of the filter circuit to the second input of the filter circuit or the first output of the filter circuit to the second output of the filter circuit. The switching circuit has a control input to receive a control signal having one of a first state and a second state, and the switching circuit is configured to electrically couple the second output of the filter circuit to the second device input in response to the control signal having the first state and to electrically couple the second output of the filter circuit to one of the first input of the filter circuit and the first output of the filter circuit through a resistor in response to the control signal having the second state.

In accordance with one embodiment, the switching circuit includes a relay having a control terminal to receive the control signal, a common terminal electrically coupled to the second output of the filter circuit, a normally open terminal electrically coupled to the second device input, and a normally closed terminal electrically coupled to the resistor.

In accordance with an embodiment, the switching circuit is a first switching circuit, and the electronic device further comprises a second switching circuit that electrically couples the first output of the filter circuit to the first device input.

In accordance with another embodiment in which the switching circuit is a first switching circuit and the resistor is a first resistor, the electronic device further comprises a second switching circuit having a control input to receive the control signal. The second switching circuit is configured to electrically couple the first output of the filter circuit to the first device input in response to the control signal having the first state and to electrically couple the first output of the filter circuit to the second input of the filter circuit through a second resistor in response to the control signal having the second state.

In accordance with an embodiment in which the relay is a first relay, the second switching circuit includes a second relay having a control terminal to receive the control signal, a common terminal electrically coupled to the first output of the filter circuit, a normally open terminal electrically coupled to the first device input, and a normally closed terminal electrically coupled to the second resistor.

In accordance with another embodiment in which the switching circuit is a first switching circuit, the electronic device further comprises a second switching circuit having a control input to receive the control signal, the second switching circuit being configured to electrically couple the first output of the filter circuit to the first device input in response to the control signal having the first state and to electrically couple the first output of the filter circuit to the second output of the filter circuit through the resistor in response to the control signal having the second state. In accordance with a further aspect of this embodiment in which the first switching circuit includes a first relay, the second switching circuit includes a second relay having a control terminal to receive the control signal, a common terminal electrically coupled to the first output terminal of the filter circuit, a normally open terminal electrically coupled to the first device input terminal, and a normally closed terminal electrically coupled to the resistor.

In accordance with another embodiment, the switching circuit is a first switching circuit and the electronic device further comprises a second switching circuit that electrically couples the first output of the filter circuit to the first device input.

In accordance with another embodiment, the switching circuit is further configured to electrically decouple the second output of the filter circuit from the second device input in response to the control signal having the second state.

In accordance with any of the above described embodiments, the electronic device may further comprise a control circuit to monitor line voltages received on the first line input and the second line input, the control circuit being configured to provide the control signal having the first state in response to the line voltages received on the first line input and the second line input being within a normal operating range of the electronic device and to provide the control signal having the second state in response to the line voltages received on the first line input and the second line input being outside the normal operating range of the electronic device.

In accordance with one embodiment, the electronic device is an uninterruptable power supply. In accordance with a further aspect of this embodiment, the first line input is configured to be electrically coupled to a first phase of power and the second line input is configured to be electrically coupled to one of a second phase of power, a neutral phase of power, and a ground reference.

In accordance with another aspect of the present invention, a method of operating an electronic device is provided. The method comprises acts of monitoring line voltages received on first and second line inputs of the electronic device to determine whether the line voltages are within an operating range of the electronic device, closing at least one switching circuit to electrically couple the line voltages to the electronic device in response to a determination that the line voltages are within the operating range of the electronic device, filtering any electro magnetic interference present on the first and second line inputs using at least one capacitor electrically coupled between the first and second line inputs, opening the at least one switching circuit to electrically decouple the line voltages from the electronic device in response to a determination that the line voltages are not within the operating range of the electronic device, and electrically coupling at least one resistor in parallel with the at least one capacitor to discharge the at least one capacitor in response to the act of opening the at least one switching circuit.

In accordance with one embodiment in which the at least one switching circuit includes a first switching circuit positioned between the first line input and a first device input of the electronic device and a second switching circuit positioned between the second line input and a second device input of the electronic device, the act of closing the at least one switching circuit can include acts of closing the first switching circuit to electrically couple the first line input to the first device input and closing the second switching circuit to electrically couple the second line input to the second device input. In accordance with a further aspect of this embodiment, the act of opening the at least one switching circuit can include acts of opening the first switching circuit to electrically decouple the first line input from the first device input and opening the second switching circuit to electrically decouple the second line input from the second device input. In accordance with a further aspect of this embodiment, the act of electrically coupling can include acts of electrically coupling a first resistor in parallel with the at least one capacitor to discharge the at least one capacitor in response to the act of opening the first switching circuit and electrically coupling a second resistor in parallel with the at least one capacitor to discharge the at least one capacitor in response to the act of opening the second switching circuit.

In accordance with another embodiment, the act of electrically coupling can include an act of electrically coupling the at least one resistor in parallel with the at least one capacitor to discharge the at least one capacitor in response to the acts of opening the first switching circuit and opening the second switching circuit.

In accordance with any of the above described embodiments, the method can further comprise acts of generating a control signal having a first state operable to close the at least one switching circuit in response to the determination that the line voltages are within the operating range of the electronic device and generating the control signal having a second state operable to open the at least one switching circuit in response to the determination that the line voltages are not within the operating range of the electronic device.

In accordance with a further aspect of the present invention, an electronic device is provided. The electronic device comprises a first line input and a second line input, a first device input and a second device input, and a filter circuit having a first input electrically coupled to the first line input, a second input electrically coupled to the second line input, a first output electrically coupled to the first device input, and a second output. The filter circuit includes at least one capacitor electrically coupling at least one of the first input of the filter circuit to the second input of the filter circuit or the first output of the filter circuit to the second output of the filter circuit, and the electronic device further comprises means for electrically coupling the second output of the filter circuit to the second device input in a first state and for electrically coupling the second output of the filter circuit to one of the first input of the filter circuit and the first output of the filter circuit through a resistor in a second state.

In accordance with one embodiment, the means for electrically coupling electrically decouples the second output of the filter circuit from the second device input in the second state.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
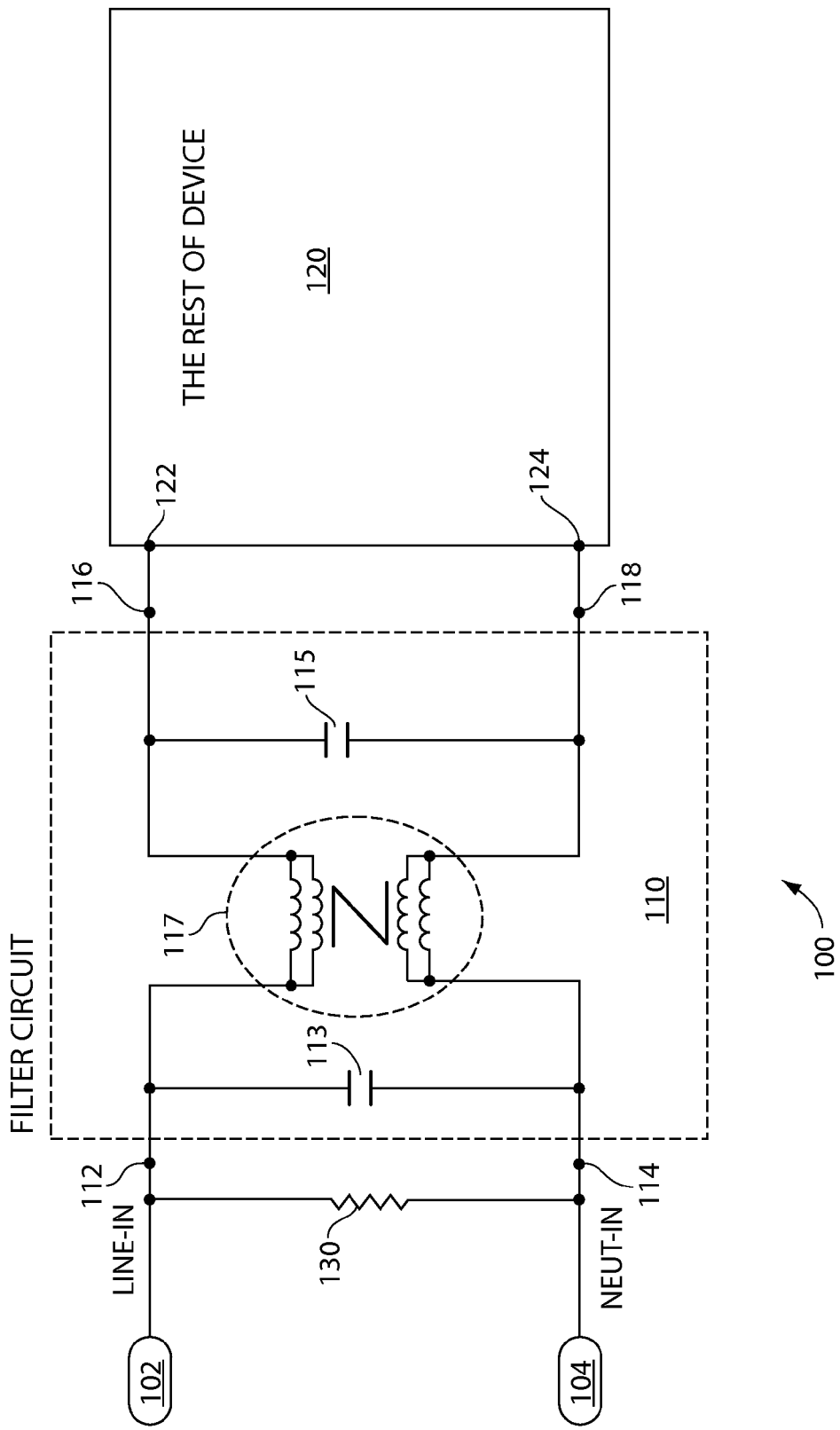
FIG. 1 is a schematic diagram of a conventional approach used to dissipate energy stored in the capacitors of a filter circuit of an electronic device.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As discussed above, the vast majority of electronic devices typically include some sort of filtering to filter or shield the electronic device from EMI, to filter or shield line inputs of an electronic device from EMI generated by the electronic device, or both. Such EMI filtering typically includes one or more capacitors electrically coupled between a power input terminal and a neutral input terminal of the electronic device, between power input terminals of the electronic device receiving different phases of power, or between a power input terminal and ground. Various regulatory standards require that when the input cord of the electronic device is disconnected from a power source, the voltage available on the input pins of the input cord must drop below a particular voltage level (e.g., below about 60 volts) or below a particular energy level within a certain amount of time (e.g., typically about 1 second or less).

FIG. 1 is a schematic diagram of a conventional approach used to dissipate energy stored in the capacitors of a filter circuit of an electronic device. The electronic device 100 includes a filter circuit 110 to filter EMI that is disposed between a pair of line input terminals 102, 104 of the electronic device 100 and a pair device input terminals 122, 124 electrically coupled to other downstream circuitry 120 (e.g., the remainder) of the electronic device 100. As shown in FIG. 1, the first line input terminal 102 may correspond to a 'hot' terminal carrying a line voltage received from a power source and the second line input terminal 104 may correspond to a neutral terminal of the power source. It should be appreciated that the first line input terminal 102 could alternatively correspond to a 'hot' terminal carrying a first phase of power received from the power source and the second line input terminal 104 could correspond to a 'hot' terminal carrying a different phase of power, or that the second line input terminal 104 could alternately correspond to a ground reference terminal The filter circuit 110 has a first input terminal 112 that is electrically coupled to the first line input terminal 102, a second input terminal 114 that is electrically coupled to the second line input terminal 104, a first output terminal 116 that is electrically coupled to the first device input terminal 122, and a second output terminal 118 that is electrically coupled to the second device input terminal 124. As illustrated in FIG. 1, the filter circuit 110 includes a first capacitor 113 that is electrically coupled between the first and second input terminals 112, 114 of the filter circuit and a second capacitor 115 that is electrically coupled between the first and second output terminals 116, 118 of the filter circuit. The filter circuit 110 also includes a cross-coupled inductor 117 in which a first portion of the cross-coupled inductor is electrically coupled in series between the first input terminal 112 of the filter circuit and the first output terminal 116 of the filter circuit, and a second portion of the inductor is electrically coupled in series between the second input terminal 114 of the filter circuit and the second output terminal 118 of the filter circuit.

To dissipate power stored in the first and second capacitors 113, 115 upon disconnection of the first and second line input terminals 102, 104 from the power source, the electronic device 100 includes a discharge resistor 130 electrically coupled between the first line input terminal 102 and the second line input terminal 104. Although this approach effectively discharges the first and second capacitors 113, 115 when the first and second line input terminals are disconnected from the power source, during normal operation (e.g., when the first and second line input terminals 102, 104 are operatively coupled to a power source) the resistor 130 draws a certain amount of power that results in a waste of energy. Because this conventional approach wastes energy during normal operation, other approaches have been developed.

Figure 2:
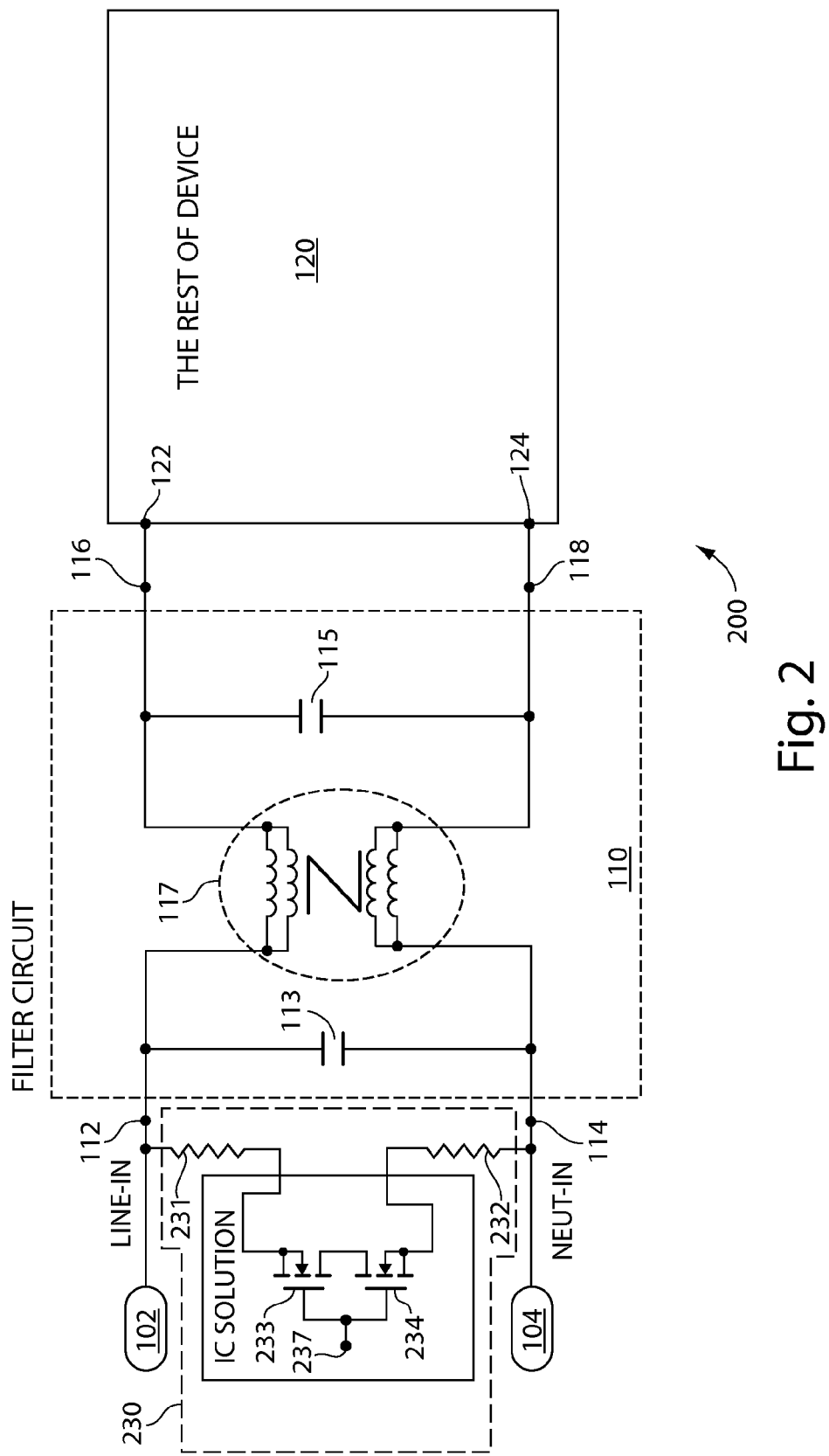
FIG. 2 is a schematic diagram of a conventional approach used to dissipate energy stored in the capacitors of a filter circuit of an electronic device that does not waste energy during normal operation.

FIG. 2 is a schematic diagram of an alternative approach that is used to dissipate energy stored in the capacitors of a filter circuit of an electronic device, and which does not waste energy during normal operation. The electronic device 200 again includes a filter circuit 110 to filter EMI that is disposed between a pair of line input terminals 102, 104 of the electronic device 200 and a pair device input terminals 122, 124 electrically coupled to other downstream circuitry 120 (e.g., the remainder) of the electronic device 200. The first line input terminal 102 may correspond to a 'hot' terminal carrying a line voltage received from a power source and the second line input terminal 104 may correspond to a neutral terminal of the power source, although as described with respect to FIG. 1, the first line input terminal 102 could alternatively correspond to a 'hot' terminal carrying a first phase of power and the second line input terminal 104 could correspond to a 'hot' terminal carrying a different phase of power, or the second line input terminal 104 could alternately correspond to a ground reference terminal.

The filter circuit 110 again includes a first and second input terminals 112, 114, first and second output terminals 116, 118, first and second capacitors 113, 115, and a cross-coupled inductor 117 that are connected and operate in the manner previously described with respect to FIG. 1.

To dissipate power stored in the first and second capacitors 113, 115 upon disconnection of the first and second line input terminals 102, 104 from the power source, the electronic device 200 includes a discharge circuit 230 electrically coupled between the first line input terminal 102 and the second line input terminal 104. In one conventional approach, the discharge circuit 230 includes a pair of resistors 231, 232 coupled in series with a pair of bilateral switches 233, 234, such as FETs. A control circuit (not shown), which may include a microprocessor, monitors the line voltage sources on the first and second line input terminals 102, 104 and asserts a first control voltage on terminal 237 that maintains the switches 233, 234 in an open position while the line voltage sources are present (e.g., when the first and second line input terminals 102, 104 are operatively coupled to a power source). When the line voltage sources are no longer present on the first and second line input terminals 102, 104, such as when the first and second line input terminals are disconnected from the power source, the control circuit asserts a second control voltage on terminal 237 that closes the switches 233, 234 and operatively couples the pair of resistors 231, 232 in series between the first line input terminal 102 and the second line input terminal 104 to discharge the first and second capacitors 113, 115. Although this approach eliminates power dissipation in the pair of resistors 231, 232 during normal operation, the discharge circuitry 230 adds components and cost.

In light of upcoming Energy Star, Department of Energy (DOE), and other "Green" Technology standards which do presently, or will soon require improved energy efficiency for plug-in products, Applicants have developed various systems and methods for discharging a capacitance of an electronic device that do not dissipate power during normal operation. In accordance with various embodiments in which the electronic device is an uninterruptible power supply (UPS), these systems and methods may add little or no components and/or cost to the electronic device relative to conventional approaches.

Figure 3A:
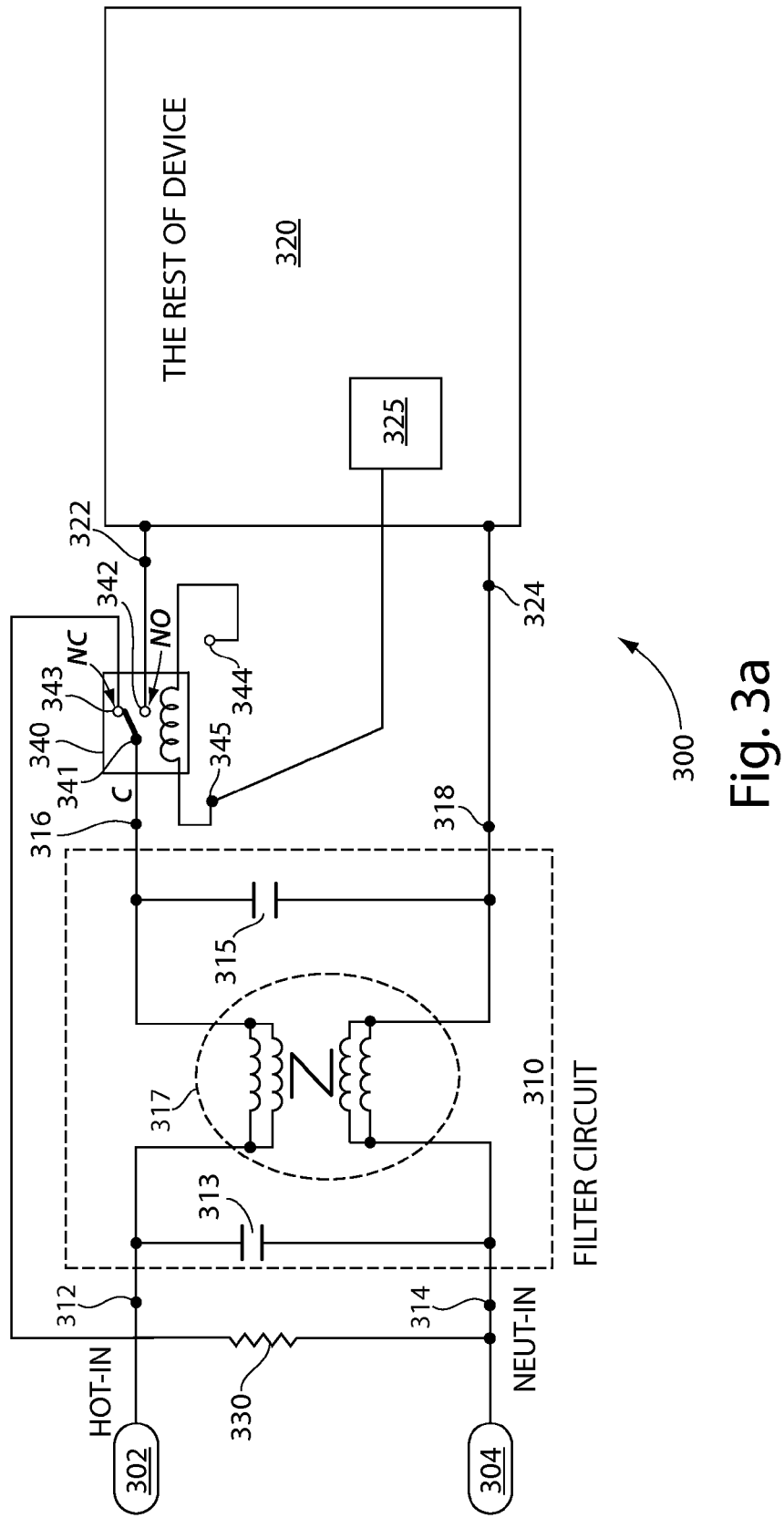
FIG. 3a is a schematic diagram of an electronic device in accordance with an embodiment of the present invention that can dissipate energy stored in an input capacitance of the electronic device in response to disconnection from a power source and which does not waste energy during normal operation.

FIG. 3a is a schematic diagram of an electronic device in accordance with an embodiment of the present invention that includes electronic circuitry to dissipate power stored in one or more input capacitors in response to disconnection of the line input terminals from a power source, and which dissipates little or no power during normal operation. In accordance with an embodiment of the present invention, the electronic device 300 may be a UPS system, such as for example, a Symmetra™ UPS system, a Smart-UPS® UPS system, or a Smart-UPS® On-Line UPS system available from American Power Conversion Corporation, West Kingston, R.I. The electronic device 300 includes a filter circuit 310 to filter EMI that is disposed between a pair of line input terminals 302, 304 of the electronic device and a pair device input terminals 322, 324 electrically coupled to other downstream circuitry 320 (e.g., the remainder) of the electronic device 300. As shown in FIG. 3a, the first line input terminal 302 may correspond to a 'hot' terminal carrying a line voltage received from a power source and the second line input terminal 304 may correspond to a neutral terminal of the power source. It should be appreciated that the first line input terminal 302 could alternatively correspond to a 'hot' terminal carrying a first phase of power received from the power source and the second line input terminal 304 could correspond to another 'hot' terminal carrying a different phase of power, or that the second line input terminal 304 could alternately correspond to a ground reference terminal The filter circuit 310 has a first input terminal 312 that is electrically coupled to the first line input terminal 302, a second input terminal 314 that is electrically coupled to the second line input terminal 304, a first output terminal 316 that is electrically coupled through a switching circuit 340 to the first device input terminal 322, and a second output terminal 318 that is electrically coupled to the second device input terminal 324. As illustrated in FIG. 3a, the filter circuit 310 includes a first capacitor 313 that is electrically coupled between the first and second input terminals 312, 314 of the filter circuit and a second capacitor 315 that is electrically coupled between the first and second output terminals 316, 318 of the filter circuit. The filter circuit 310 also includes a cross-coupled inductor 317 in which a first portion of the cross-coupled inductor is electrically coupled in series between the first input terminal 312 of the filter circuit and the first output terminal 316 of the filter circuit, and a second portion of the inductor is electrically coupled in series between the second input terminal 314 of the filter circuit and the second output terminal 318 of the filter circuit.

Figure 3B:
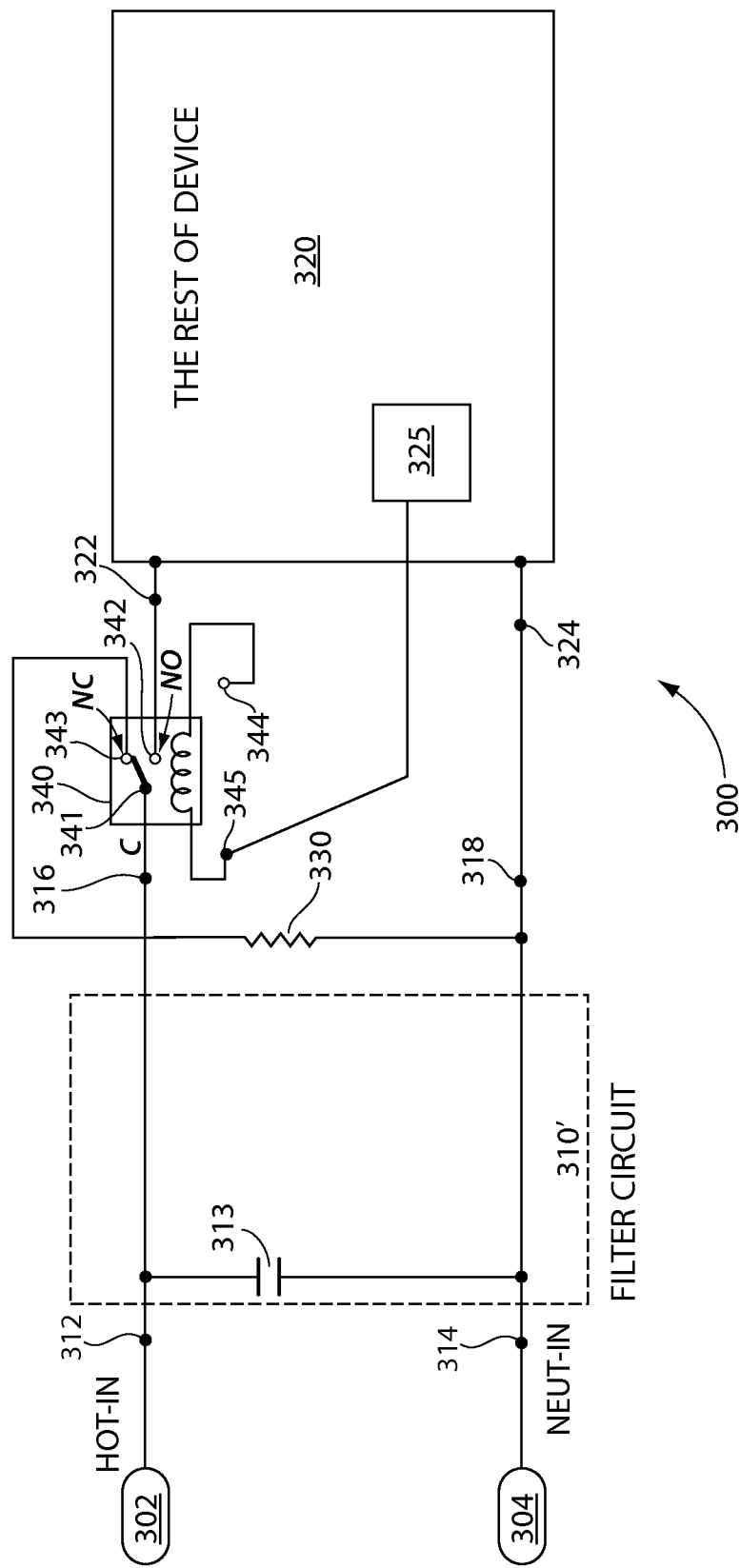
FIG. 3b is a schematic diagram of an electronic device in accordance with another embodiment of the present invention that can dissipate energy stored in an input capacitance of the electronic device in response to disconnection from a power source and which does not waste energy during normal operation.

It should be appreciated that embodiments of the present invention are not limited to the construction of the filter circuit 310 shown in FIG. 3a, as aspects and embodiments of the present invention are applicable to any type of filter circuit that includes at least one capacitor that is electrically coupled between the first line input 302 and the second line input 304 of the electronic device 300. For example, either or both of the first and second capacitors 313, 315 could include a plurality of capacitors electrically coupled in series between the first line input 302 and the second line input 304 of the electronic device 310. Alternatively, the filter circuit 310 may include only a single capacitor (e.g., capacitor 313), as shown in FIG. 3b. Although the filter circuit 310 is shown as including a cross-coupled inductor 317, it should be appreciated that the inductor need not be cross-coupled, as various types and configurations of inductors may alternatively be used, as known to those skilled in the art. Indeed, in some implementations, the filter circuit 310 may not include any inductors, as shown in FIG. 3b. Alternatively still, the filter circuit 310 may include additional components, such as Electro-Static Discharge (ESD) protection components, such as zener diodes, transorbs, etc.

In accordance with an aspect of the present invention in which the electronic device is a UPS, the switching circuit 340 may be a back-feed protection or input switch or relay that is typically placed in series between a line input and a corresponding device input of the UPS, or between each line input and a corresponding device input of the UPS. In accordance with one embodiment of the present invention, the switching circuit may be a Form C relay (also called a change-over relay or a single pole double throw (SPDT) relay) that includes a Common (C) terminal 341, a Normally Open (NO) terminal 342, a Normally Closed (NC) terminal 343, a voltage supply terminal 344, and a control terminal 345. In the embodiment depicted in FIG. 3a, the common terminal 341 of the switching circuit 340 is electrically coupled to the first output terminal 316 of the filter circuit, the NO terminal 342 is electrically coupled to the device input terminal 322, and the NC terminal 343 is electrically coupled to the second line input terminal 304 (as well as the second input 314 of the filter circuit 310) through a resistor 330. It should be appreciated that the NC terminal 343 could alternatively be electrically coupled to the to the second output terminal 318 of the filter circuit 310 through the resistor 330 to achieve similar functionality, as described further below with respect to FIG. 3b. In the embodiment depicted in FIG. 3a, the voltage supply terminal 344 of the switching circuit 340 is electrically coupled to a suitable voltage source capable of energizing the switching circuit, and the control terminal 345 of the switching circuit is electrically coupled to a control circuit 325, such as a processor or PLD of the electronic device 300. It should be appreciated that depending on the capabilities of the control circuit 325 and the requirements of the switching circuit 340, the switching circuit 340 may be electrically coupled to the control circuit 325 via a relay drive circuit (not shown).

The control circuit 325 monitors the line voltage sources on the first and second line input terminals 302, 304 or the first and second output terminals 316, 318 of the filter circuit and asserts either a first control voltage or a second control voltage that is received by terminal 345. During normal operation (e.g., where the electronic device 300 is operatively coupled to a power source) and the line voltage sources are within a normal operating range, the control circuit 325 asserts the first control voltage that energizes the switching circuit 340 and electrically couples the common terminal 341 to the NO terminal 342. In this first state in which the common terminal 341 is electrically coupled to the NO terminal 342, the resistor 330 is electrically disconnected and dissipates no power. Alternatively, when the line input terminals of the electronic device are disconnected from the power source, the control circuit detects a DC component, or a deviation from the expected waveform, and asserts the second voltage that de-energizes the switching circuit 340 and electrically couples the common terminal 341 to the NC terminal 343. In this second state in which the common terminal 341 is electrically coupled to the NC terminal 343, the resistor 330 is placed in parallel with the input capacitance (i.e., the first capacitor 313 and the second capacitor 315) and discharges the input capacitance within the certain period of time (e.g., about one second or less) defined by the various regulatory standards.

It should be appreciated that the switching circuit 340 may be configured differently than as shown in FIG. 3a with no loss in functionality. For example, the switching circuit 340 illustrated in FIG. 3a could alternatively be connected so that the common terminal 341 is electrically coupled to the first output terminal 316 of the filter circuit as shown in FIG. 3a, the NO terminal 342 electrically coupled to the second line input terminal 304 through the resistor 330, and the NC terminal 343 electrically coupled to the first device input terminal 322. In this alternative embodiment, the control voltages provided by the control circuit 325 would, as known to those skilled in the art, be inverted from that described above with respect to FIG. 3a to provide similar functionality.

It should be appreciated that the embodiment depicted in FIG. 3a permits any energy stored by the capacitors of the filter circuit 310 of the electronic device 300 to be discharged to a safe energy level within the time period proscribed by the various regulatory standards upon disconnection from a power source, while wasting little or no energy during normal operation of the electronic device. Moreover, where the electronic device 300 is a UPS that includes a back-feed protection or input switch or relay, such as a Form C relay, electrically coupled in series between the line input terminal and a corresponding device input terminal, this functionality may be provided with minimal cost and complexity. For example, where the electronic device is a UPS that already includes a Form C relay for feed-back protection or input switching, this functionality requires no additional components relative to the conventional circuit illustrated in FIG. 1. Moreover, where existing designs of an electronic device includes a different type of back-feed protection or input switch, such as single throw (e.g., single pole, single throw) relay, such existing designs may be readily modified to use a single pole double throw type switch, such as a Form C relay at minimal cost.

FIG. 3b is a schematic diagram of an electronic device in accordance with an alternative embodiment of the present invention that includes electronic circuitry to dissipate power stored in one or more input capacitors in response to disconnection of the line input terminals from a power source, and which dissipates little or no power during normal operation. As the embodiment of FIG. 3b is similar to the embodiment described above with respect to FIG. 3a, only the differences are described in detail herein.

As in the embodiment of FIG. 3a, the filter circuit 310' of FIG. 3b includes at least one capacitor 313 that is electrically coupled between the first and second input terminals 312, 314 of the filter circuit 310'. However, the filter circuit 310' of FIG. 3b does not include either the second capacitor 315, or the cross-coupled inductor 317, illustrating that these additional components are optional. As shown in FIG. 3b, the NC terminal 343 of the switching circuit 340 is electrically coupled to the second output terminal 318 of the filter circuit 310' through the resistor 330.

Operation of the embodiment depicted in FIG. 3b is similar to that described above with respect to FIG. 3a. Specifically, during normal operation (e.g., where the electronic device 300 is operatively coupled to a power source) and the line voltage sources are within a normal operating range, the control circuit 325 asserts the first control voltage that energizes the switching circuit 340 and electrically couples the common terminal 341 to the NO terminal 342. In this first state in which the common terminal 341 is electrically coupled to the NO terminal 342, the resistor 330 is electrically disconnected and dissipates no power. Alternatively, when the line input terminals of the electronic device are disconnected from the power source, the control circuit detects a DC component, or a deviation from the expected waveform, and asserts the second voltage that de-energizes the switching circuit 340 and electrically couples the common terminal 341 to the NC terminal 343. In this second state in which the common terminal 341 is electrically coupled to the NC terminal 343, the resistor 330 is placed in parallel with the input capacitance (i.e., the first capacitor 313) and discharges the input capacitance within the certain period of time (e.g., about one second or less) defined by the various regulatory standards.

As in the embodiment described with respect to FIG. 3a above, the switching circuit 340 of the embodiment of FIG. 3b may be configured differently than as shown in FIG. 3b with no loss in functionality. For example, the switching circuit 340 illustrated in FIG. 3b could alternatively be connected so that the common terminal 341 is electrically coupled to the first output terminal 316 of the filter circuit 310' as shown in FIG. 3b, the NO terminal 342 electrically coupled to the second output terminal 318 of the filter circuit 310' through the resistor 330, and the NC terminal 343 electrically coupled to the first device input terminal 322. In this alternative embodiment, the control voltages provided by the control circuit 325 would, as known to those skilled in the art, be inverted from that described above with respect to FIG. 3b to provide similar functionality.

Figure 4A:
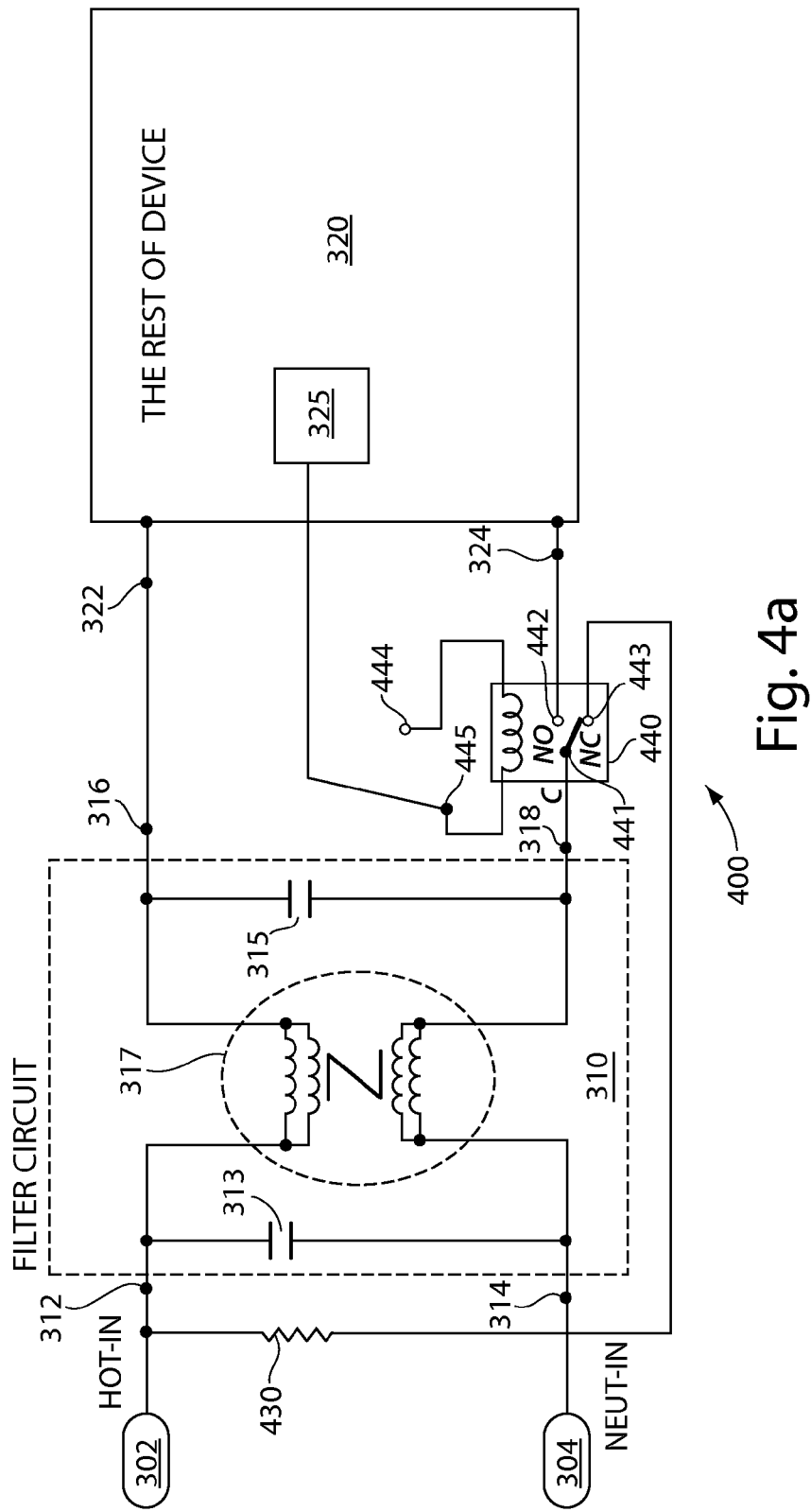
FIG. 4a is a schematic diagram of an electronic device in accordance with another embodiment of the present invention that can dissipate energy stored in an input capacitance of the electronic device in response to disconnection from a power source and which does not waste energy during normal operation.

FIG. 4a is a schematic diagram of an electronic device in accordance with another embodiment of the present invention that includes electronic circuitry to dissipate power stored in one or more input capacitors in response to disconnection of the line input terminals from a power source, and which dissipates little or no power during normal operation. Because this electronic device is similar in construction to the electronic device 300 described above with respect to FIG. 3a, only the differences are described in detail herein. As in the embodiment described with respect to FIG. 3a, the electronic device 400 may be a UPS system. As in the electronic device 300 of FIG. 3a, the electronic device 400 of FIG. 4a includes a filter circuit 310 that is disposed between a pair of line input terminals 302, 304 of the electronic device 400 and a pair device input terminals 322, 324 electrically coupled to other downstream circuitry 320 (e.g., the remainder) of the electronic device 400. However, in contrast to the electronic device 300 of FIG. 3a that includes a switching circuit 340 electrically coupled between the first output terminal 316 of the filter circuit 310 and the first device input 322 of the electronic device, the first output terminal 316 of the filter circuit 310 is electrically coupled to the first device input 322 of the electronic device 400, and a switching circuit 440 is electrically coupled between the second output terminal 318 of the filter circuit 310 and the second device input terminal 324 of the electronic device 400.

In accordance with an aspect of the present invention in which the electronic 400 device is a UPS, the switching circuit 440 may again be a back-feed protection or input switch or relay, such as a Form C relay, that is typically placed in series between a line input and a corresponding device input of the UPS, or between each line input and a corresponding device input of the UPS. In the embodiment depicted in FIG. 4a, the common terminal 441 of the switching circuit 440 is electrically coupled to the second output terminal 318 of the filter circuit, the NO terminal 442 is electrically coupled to the second device input terminal 324, and the NC terminal 443 is electrically coupled to the first line input terminal 302 (as well as the first input 312 of the filter circuit 310) through a resistor 430. The voltage supply terminal 444 of the switching circuit 440 is again electrically coupled to a suitable voltage source capable of actuating the switching circuit 440, and the control terminal 445 of the switching circuit 440 is electrically coupled to the control circuit 325, such as a processor or PLD of the electronic device 400. As in the previously described embodiment, it should be appreciated that depending on the capabilities of the control circuit 325 and the requirements of the switching circuit 440, the switching circuit 440 may be electrically coupled to the control circuit 325 via a relay drive circuit (not shown).

As in the embodiment depicted in FIG. 3a, the control circuit 325 monitors the line voltage sources on the first and second line input terminals 302, 304 or the first and second output terminals 316, 318 of the filter circuit and asserts either a first control voltage or a second control voltage that is received by terminal 445. During normal operation (e.g., where the electronic device 400 is operatively coupled to a power source) and the line voltage sources are within a normal operating range, the control circuit asserts the first control voltage that energizes the switching circuit 440 and electrically couples the common terminal 441 to the NO terminal 442. In this first state in which the common terminal 441 is electrically coupled to the NO terminal 442, the resistor 430 is electrically disconnected and dissipates no power. Alternatively, when the electronic device 400 is disconnected from the power source, the control circuit 325 detects a DC component, or a deviation from the expected waveform, and asserts the second voltage that de-energizes the switching circuit 440 and electrically couples the common terminal 441 to the NC terminal 443. In this second state, the resistor 430 is placed in parallel with the input capacitance (i.e., the first capacitor 313 and the second capacitor 315) and discharges the input capacitance within the certain period of time defined by the standards.

As in the embodiment described with respect to FIG. 3a, the switching circuit 440 may be configured differently than as shown in FIG. 4a with no loss in functionality. For example, the switching circuit 440 illustrated in FIG. 4a could alternatively be connected so that the common terminal 441 is electrically coupled to the second output terminal 318 of the filter circuit as shown in FIG. 4a, the NO terminal 442 electrically coupled to the first line input terminal 302 through the resistor 430, and the NC terminal 443 electrically coupled to the second device input terminal 324. In this latter disclosed alternative embodiment, the control voltages provided by the control circuit would, as known to those skilled in the art, be inverted from that described above with respect to FIG. 4a to provide similar functionality.

It should be appreciated that like the embodiments depicted in FIGS. 3a and 3b, the embodiment described above with respect to FIG. 4a permits any energy stored by the capacitors of the filter circuit 310 of the electronic device 400 to be discharged to a safe energy level within the time period proscribed by the various regulatory standards upon disconnection from a power source, while wasting little or no energy during normal operation of the electronic device. Moreover, where the electronic device 400 is a UPS that includes a back-feed protection or input switch or relay, such as a Form C relay, electrically coupled in series between the neutral input terminal and a corresponding device input terminal, this functionality may be provided with minimal cost and complexity. Indeed, where the electronic device is a UPS that already includes a Form C relay for feed-back protection or input switching, this functionality requires no additional components relative to the conventional circuit illustrated in FIG. 1, and where existing designs include a different type of back-feed protection or input switch, such as a single throw (e.g., single pole, single throw) relay, such existing designs may be readily modified to use a single pole double throw type switch, such as a Form C relay, at minimal cost.

Figure 4B:
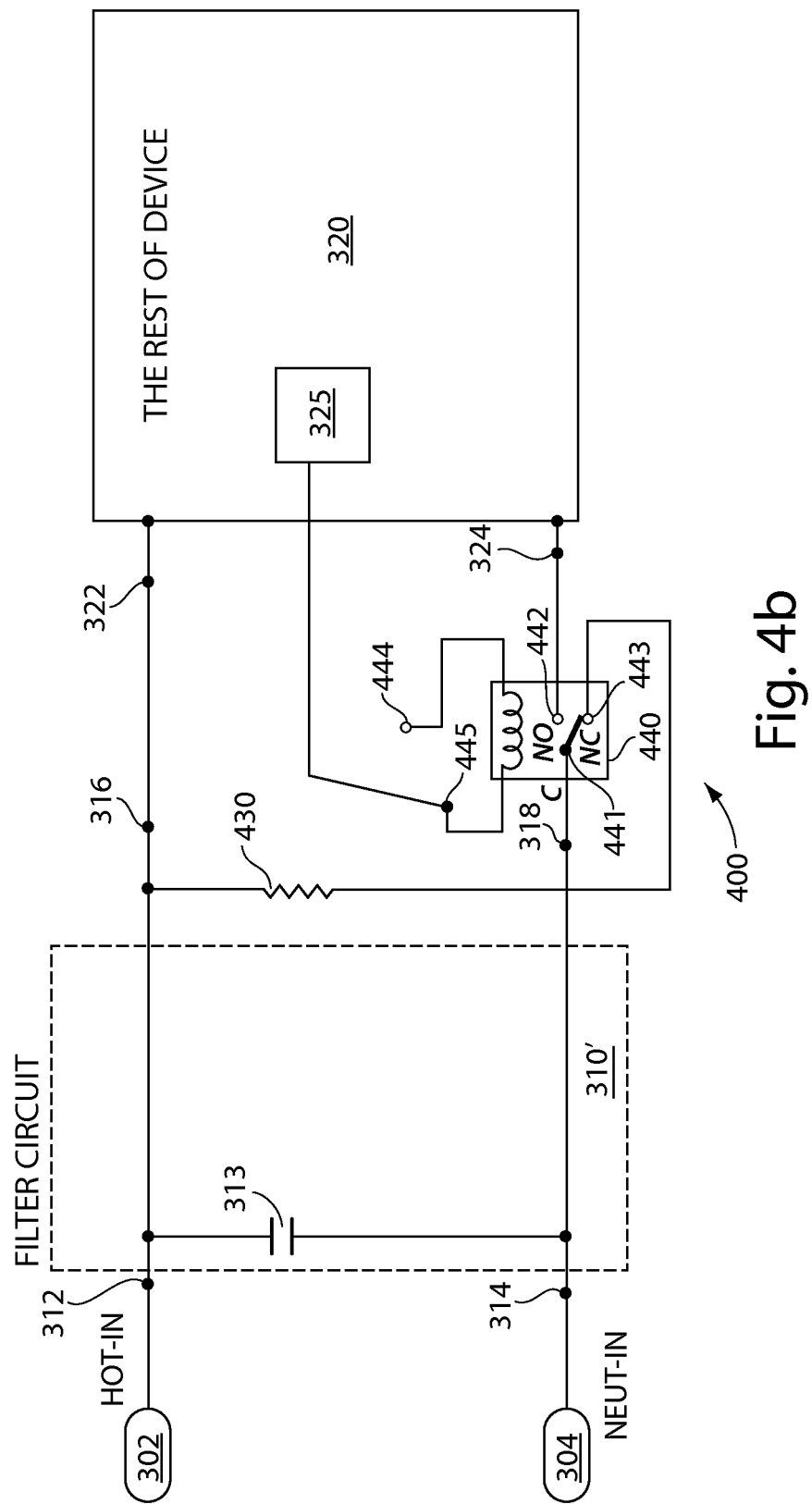
FIG. 4b is a schematic diagram of an electronic device in accordance with another embodiment of the present invention that can dissipate energy stored in an input capacitance of the electronic device in response to disconnection from a power source and which does not waste energy during normal operation.

FIG. 4b is a schematic diagram of an electronic device in accordance with an alternative embodiment of the present invention that includes electronic circuitry to dissipate power stored in one or more input capacitors in response to disconnection of the line input terminals from a power source, and which dissipates little or no power during normal operation. As the embodiment of FIG. 4b is similar to the embodiment described above with respect to FIG. 4a, only the differences are described in detail herein.

As in the embodiment of FIG. 4a, the filter circuit 310' of FIG. 4b includes at least one capacitor 313 that is electrically coupled between the first and second input terminals 312, 314 of the filter circuit 310'. However, like the filter circuit 310' of FIG. 3b, the filter circuit 310' of FIG. 4b does not include either the second capacitor 315, or the cross-coupled inductor 317, and the NC terminal 443 of the switching circuit 440 is electrically coupled to the first output terminal 316 of the filter circuit 310' through the resistor 430.

Operation of the embodiment depicted in FIG. 4b is similar to that described above with respect to FIG. 4a. During normal operation (e.g., where the electronic device 400 is operatively coupled to a power source) and the line voltage sources are within a normal operating range, the control circuit 325 asserts the first control voltage that energizes the switching circuit 440 and electrically couples the common terminal 441 to the NO terminal 442. In this first state in which the common terminal 441 is electrically coupled to the NO terminal 442, the resistor 430 is electrically disconnected and dissipates no power. Alternatively, when the line input terminals of the electronic device are disconnected from the power source, the control circuit detects a DC component, or a deviation from the expected waveform, and asserts the second voltage that de-energizes the switching circuit 440 and electrically couples the common terminal 441 to the NC terminal 443. In this second state in which the common terminal 441 is electrically coupled to the NC terminal 443, the resistor 430 is placed in parallel with the input capacitance (i.e., the first capacitor 313) and discharges the input capacitance within the certain period of time (e.g., about one second or less) defined by the various regulatory standards.

As in the embodiment described with respect to FIG. 4a above, the switching circuit 440 of the embodiment of FIG. 4b may be configured differently than as shown in FIG. 4b with no loss in functionality. For example, the switching circuit 440 illustrated in FIG. 4b could alternatively be connected so that the common terminal 441 is electrically coupled to the second output terminal 318 of the filter circuit 310' as shown in FIG. 4b, the NO terminal 442 electrically coupled to the first output terminal 316 of the filter circuit 310' through the resistor 430, and the NC terminal 443 electrically coupled to the second device input terminal 324. In this alternative embodiment, the control voltages provided by the control circuit 325 would, as known to those skilled in the art, be inverted from that described above with respect to FIG. 4b to provide similar functionality.

Figure 5A:
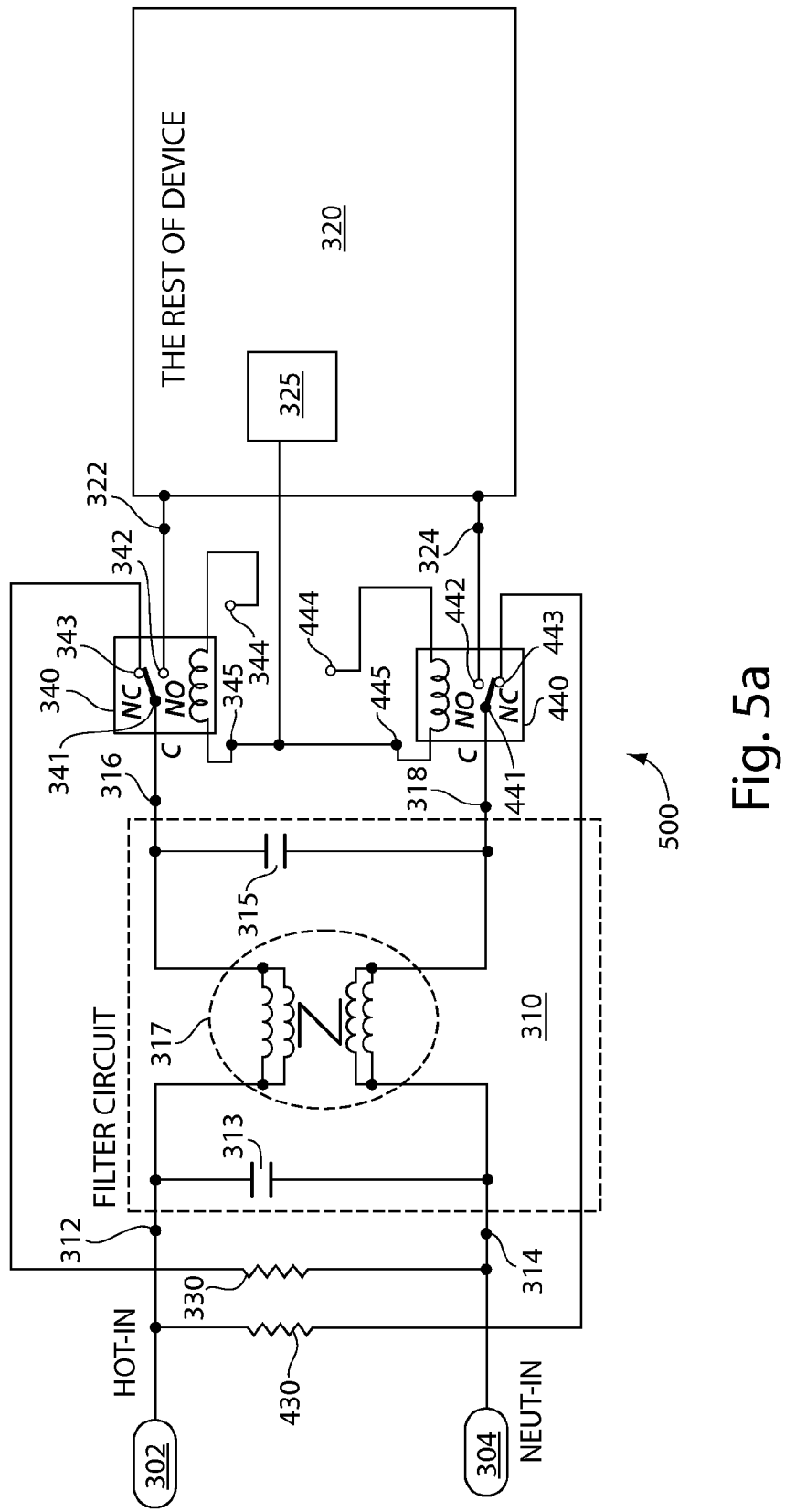
FIG. 5a is a schematic diagram of an electronic device in accordance with yet another embodiment of the present invention that can dissipate energy stored in an input capacitance of the electronic device in response to disconnection from a power source and which does not waste energy during normal operation.

FIG. 5a is a schematic diagram of an electronic device in accordance with yet another embodiment of the present invention that includes electronic circuitry to dissipate power stored in one or more input capacitors in response to disconnection of the line input terminals from a power source, and which dissipates little or no power during normal operation. Because the electronic device 500 is similar in construction to the electronic devices 300 and 400 described above with respect to FIGS. 3a and 3b and 4a and 4b, only the differences are described in detail herein. As in the embodiments described with respect to FIGS. 3a and 4a and 4a and 4b, the electronic device 500 may be a UPS system.

As in the electronic device 300 and 400 of FIGS. 3 and 4, the electronic device 500 of FIG. 5a includes a filter circuit 310 that is disposed between a pair of line input terminals 302, 304 of the electronic device 500 and a pair device input terminals 322, 324 electrically coupled to other downstream circuitry 320 (e.g., the remainder) of the electronic device 500. However, the electronic device 500 includes a plurality of switching circuits, including a first switching circuit 340 electrically coupled between the first output terminal 316 of the filter 310 and the first device input 322 of the electronic device 500, and a second switching circuit 440 electrically coupled between the second output terminal 318 of the filter circuit 310 and the second device input terminal 324 of the electronic device 500.

In accordance with an aspect of the present invention in which the electronic 500 device is a UPS, each of the switching circuits 340, 440 may again be a back-feed protection or input switch or relay, such as a Form C relay, that is typically placed in series between a line input and a corresponding device input of the UPS, or as shown in FIG. 5a, between each line input and a corresponding device input of the UPS. In the embodiment depicted in FIG. 5a, the common terminal 341 of the first switching circuit 340 is electrically coupled to the first output terminal 316 of the filter circuit 310, the NO terminal 342 is electrically coupled to the device input terminal 322, and the NC terminal 343 is electrically coupled to the second line input terminal 304 through a first resistor 330. The voltage supply terminal 344 of the first switching circuit 340 is electrically coupled to a suitable voltage source capable of actuating the first switching circuit 340, and the control terminal 345 of the first switching circuit is electrically coupled to a control circuit 325, such as a processor or PLD of the electronic device. The common terminal 441 of the second switching circuit 440 is electrically coupled to the second output terminal 318 of the filter circuit, the NO terminal 442 is electrically coupled to the second device input terminal 324, and the NC terminal 443 is electrically coupled to the first line input terminal 302 through a second resistor 430. The voltage supply terminal 444 of the second switching circuit 440 is again electrically coupled to a suitable voltage source capable of actuating the second switching circuit 440, and the control terminal 445 of the second switching circuit 440 is electrically coupled to the control circuit 325, such as a processor or PLD of the electronic device. As with the previously described embodiments, it should be appreciated that depending on the capabilities of the control circuit 325 and the requirements of the switching circuits 340, 440, the switching circuits 340, 440 may be electrically coupled to the control circuit 325 via a respective relay drive circuit (not shown).

As in the embodiment depicted in FIGS. 3a and 3b and 4a and 4b, the control circuit 325 monitors the line voltage source on the first and second line input terminals 302, 304 or the first and second output terminals 316, 318 of the filter circuit and asserts either a first control voltage or a second control voltage that is received by terminals 345 and 445. During normal operation (e.g., where the electronic device 500 is operatively coupled to a power source) and the line voltage sources are within a normal operating range, the control circuit 325 asserts the first control voltage that energizes each of the switching circuits 340, 440 and electrically couples the common terminal 341 to the NO terminal 342 of first switching circuit 340 and the common terminal 441 to the NO terminal 442 of second switching circuit 440. In this first state in which the common terminal 341 is electrically coupled to NO terminal 342 and common terminal 441 is electrically coupled to the NO terminal 442, resistors 330 and 430 are electrically disconnected and dissipate no power. Alternatively, when the electronic device 500 is disconnected from the power source, the control circuit 325 detects a DC component, or a deviation from the expected waveform, and asserts the second voltage that de-energizes each of the switching circuits 340, 440 and electrically couples the common terminal 341 to the NC terminal 343 of the first switching circuit 340 and the common terminal 441 to the NC terminal 443 of the second switching circuit 440. In this second state, the resistors 330 and 340 are each placed in parallel with the input capacitance (i.e., the first capacitor 313 and the second capacitor 315) and discharge the input capacitance within the certain period of time defined by the standards.

It should be appreciated that the embodiment depicted in FIG. 5a provides a redundant discharge path in the event of component failure relative to the embodiments described previously with respect to FIGS. 3a and 3b and 4a and 4b. For example, should the first switching circuit 340 fail to de-energize appropriately in response to disconnection of the electronic device 500 from a source of power, or should resistor 330 fail, the second switching circuit 440 and resistor 430 can still discharge the input capacitance within the certain period of time defined by the standards, and vice versa. Moreover, the embodiment depicted in FIG. 5a provides a redundant discharge path with minimal additional component cost or complexity relative to the conventional approach depicted in FIG. 1, particularly where the switching circuits 340, 440 are already included in the electronic device 500 for purposes such as back-feed protection or input switching, such as in a UPS. Thus, where the electronic device 500 already includes Form C relays for back-feed protection or input switching, the embodiment described with respect to FIG. 5a adds only one additional resistor relative to the conventional approach of FIG. 1, yet does not waste energy during normal operation and provides a redundant path for the discharge of stored energy in response to disconnection from a source of power. As in the embodiments of FIGS. 3 and 4, where existing designs include a different type of back-feed protection or input switch, such as a single throw (e.g., single pole, single throw) relay, such existing designs may be readily modified to use a single pole double throw type switch, such as a Form C relay, at minimal cost.

As in the embodiments described with respect to FIGS. 3a and 3b and 4a and 4b, the switching circuits 340 and 440 may be configured differently with no loss in functionality. For example, each of the switching circuits 340, 440 illustrated in FIG. 5a could alternatively be connected so that the common terminal 341, 441 of each switching circuit 340, 440 is electrically coupled to a respective output terminal 316, 318 of the filter circuit 310 as shown in FIG. 5a, the NO terminal 342, 442 electrically coupled to line input terminal 304, 302 through resistor 330, 430, and the NC terminal 343, 443 electrically coupled to the device input terminal 322, 422. In such an alternative embodiment, the control voltages provided by the control circuit 325 would, as known to those skilled in the art, be inverted from that described above with respect to FIG. 5a to provide similar functionality. One of ordinary skill in the art should appreciate that the switching circuits 340,440 need not be controlled by the same control signal, as separate control signals may be used.

Figure 5B:
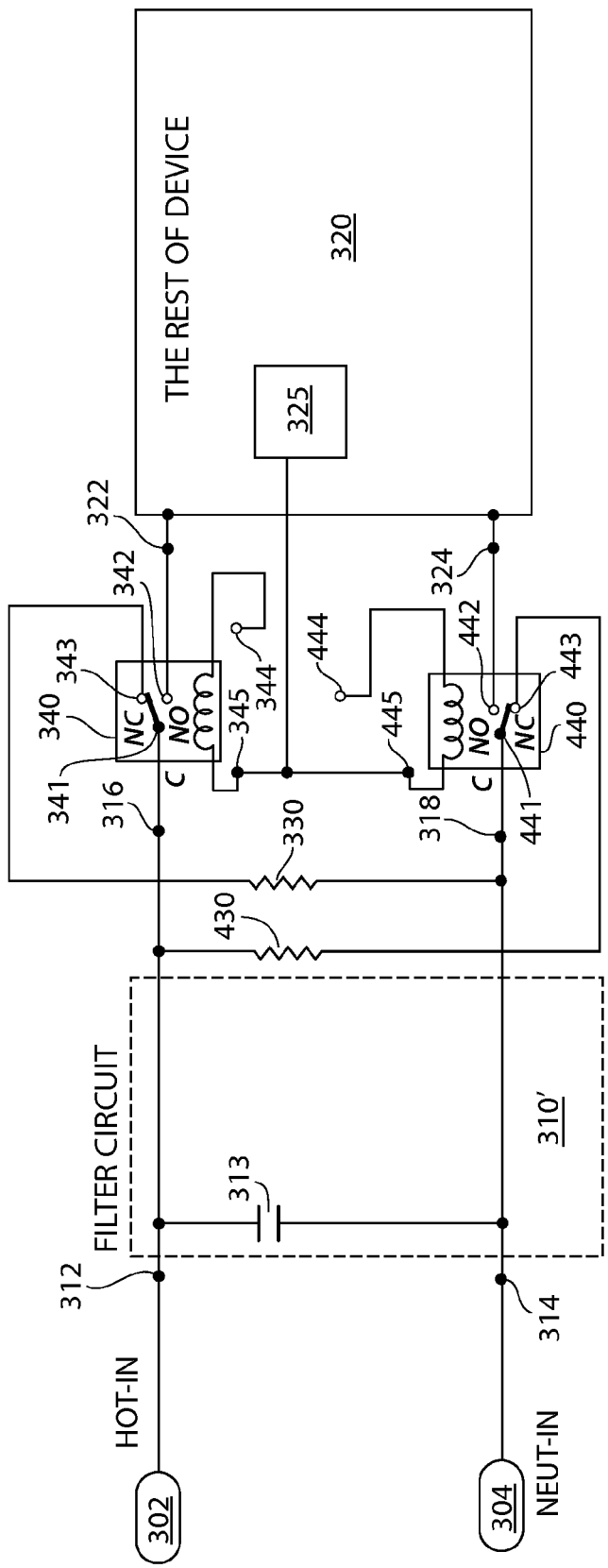
FIG. 5b is a schematic diagram of an electronic device in accordance with yet another embodiment of the present invention that can dissipate energy stored in an input capacitance of the electronic device in response to disconnection from a power source and which does not waste energy during normal operation.

FIG. 5b is a schematic diagram of an electronic device in accordance with an alternative embodiment of the present invention that includes electronic circuitry to dissipate power stored in one or more input capacitors in response to disconnection of the line input terminals from a power source, and which dissipates little or no power during normal operation. As the embodiment of FIG. 5b is similar to the embodiment described above with respect to FIG. 5a, only the differences are described in detail herein.

As in the embodiment of FIG. 5a, the filter circuit 310' of FIG. 5b includes at least one capacitor 313 that is electrically coupled between the first and second input terminals 312, 314 of the filter circuit 310'. However, like the filter circuit 310' of FIGS. 3b and 4b, the filter circuit 310' of FIG. 5b does not include either the second capacitor 315, or the cross-coupled inductor 317. Further, in contrast to the embodiment described above with respect to FIG. 5a, the NC terminal 343 of the first switching circuit 340 is electrically coupled to the second output terminal 318 of the filter circuit 310' through the first resistor 330 and the NC terminal 443 of the second switching circuit 440 is electrically coupled to the first output terminal 316 of the filter circuit 310' through the second resistor 430.

Operation of the embodiment depicted in FIG. 5b is similar to that described above with respect to FIG. 5a. During normal operation (e.g., where the electronic device 500 is operatively coupled to a power source) and the line voltage sources are within a normal operating range, the control circuit 325 asserts the first control voltage that energizes each of the switching circuits 340, 440 and electrically couples the common terminal 341 to the NO terminal 342 of first switching circuit 340 and the common terminal 441 to the NO terminal 442 of second switching circuit 440. In this first state in which the common terminal 341 is electrically coupled to NO terminal 342 and common terminal 441 is electrically coupled to the NO terminal 442, resistors 330 and 430 are electrically disconnected and dissipate no power. Alternatively, when the electronic device 500 is disconnected from the power source, the control circuit 325 detects a DC component, or a deviation from the expected waveform, and asserts the second voltage that de-energizes each of the switching circuits 340, 440 and electrically couples the common terminal 341 to the NC terminal 343 of the first switching circuit 340 and the common terminal 441 to the NC terminal 443 of the second switching circuit 440. In this second state, the resistors 330 and 340 are each placed in parallel with the input capacitance (i.e., the first capacitor 313) and discharge the input capacitance within the certain period of time defined by the standards.

As with the embodiment of FIG. 5a, the embodiment of FIG. 5b provides a redundant discharge path in the event of component failure relative to the embodiments described previously with respect to FIGS. 3a, 3b, 4a, and 4b. As in the embodiments described with respect to FIGS. 3a, 3b, 4a, and 4b, the switching circuits 340 and 440 may be configured differently with no loss in functionality. For example, each of the switching circuits 340, 440 illustrated in FIG. 5b could alternatively be connected so that the common terminal 341, 441 of each switching circuit 340, 440 is electrically coupled to a respective output terminal 316, 318 of the filter circuit 310' as shown in FIG. 5b, the NO terminal 342, 442 electrically coupled to the second and the first output terminals 318, 316 of the filter circuit 310' through resistor 330, 430, and the NC terminals 343, 443 electrically coupled to the device input terminals 322, 422. In such an alternative embodiment, the control voltages provided by the control circuit 325 would, as known to those skilled in the art, be inverted from that described above with respect to FIG. 5b to provide similar functionality. One of ordinary skill in the art should appreciate that the switching circuits 340,440 need not be controlled by the same control signal, as separate control signals may be used.

Figure 6:
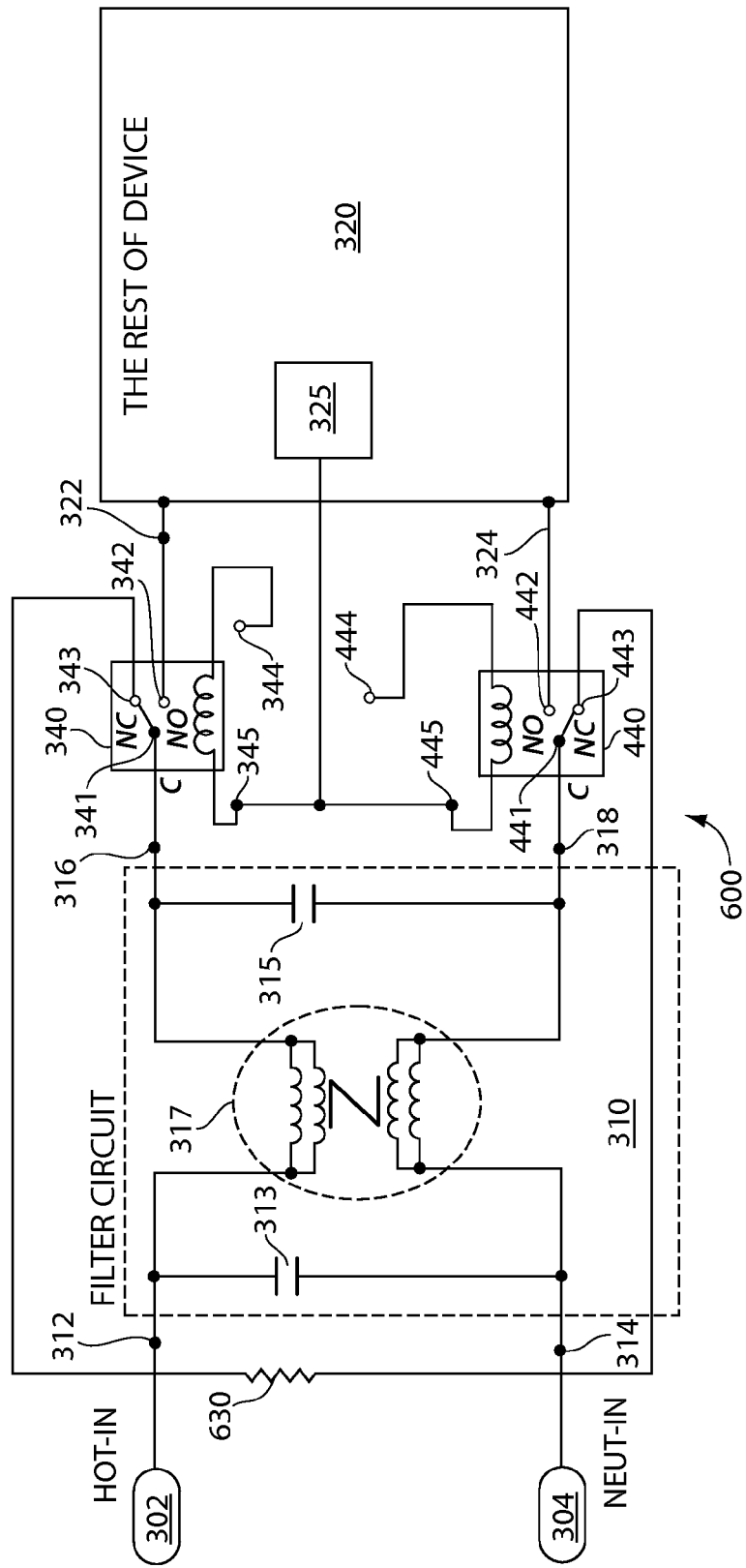
FIG. 6 is a schematic diagram of an electronic device in accordance with yet another embodiment of the present invention that can dissipate energy stored in an input capacitance of the electronic device in response to disconnection from a power source and which does not waste energy during normal operation.

FIG. 6 is a schematic diagram of an electronic device in accordance with another embodiment of the present invention that includes electronic circuitry to dissipate power stored in one or more input capacitors in response to disconnection of the line input terminals from a power source, and which dissipates little or no power during normal operation. Because the electronic device 600 is similar in construction to the electronic devices 300, 400, and 500 described above with respect to FIGS. 3a, 3b, 4a, 4b, 5a, and 5b, only the differences are described in detail herein. As in the embodiments described previously with respect to FIGS. 3a, 3b, 4a, 4b, 5a, and 5b, the electronic device 600 may be a UPS system.

The electronic device 600 again includes a filter circuit 310 that is disposed between a pair of line input terminals 302, 304 of the electronic device and a pair device input terminals 322, 324 electrically coupled to other downstream circuitry 320 (e.g., the remainder) of the electronic device. As in the electronic device 500 of FIGS. 5a and 5b, the electronic device 600 of FIG. 6 includes a plurality of switching circuits, including a first switching circuit 340 electrically coupled between the first output terminal 316 of the filter circuit 310 and the first device input 322 of the electronic device 600, and a second switching circuit 440 electrically coupled between the second output terminal 318 of the filter circuit 310 and the second device input terminal 324 of the electronic device 600.

In accordance with an aspect of the present invention in which the electronic 600 device is a UPS, each of the switching circuits 340, 440 may again be a back-feed protection or input switch or relay, such as a Form C relay, that is typically placed in series between a line input and a corresponding device input of the UPS, or as shown in FIG. 6, between each line input and a corresponding device input of the UPS. However, in contrast to the embodiment of FIG. 5a in which the NC terminal 343,443 of each of the respective switching circuits 340, 440 is electrically coupled to a respective line input terminal 304, 302 through a respective resistor 330 430, in the embodiment depicted in FIG. 6, the NC terminal 343 of the first switching circuit 340 is electrically coupled to the NC terminal 443 of the second switching circuit 440 through a resistor 630 that is common to both.

Thus, in the embodiment depicted in FIG. 6, the common terminal 341 of the first switching circuit 340 is electrically coupled to first output terminal 316 of the filter circuit, the NO terminal 342 is electrically coupled to the device input terminal 322, and the NC terminal 343 is electrically coupled to the NC terminal 443 of the second switching circuit 440 through the resistor 630. The voltage supply terminal 344 of the first switching circuit 340 is electrically coupled to a suitable voltage source capable of actuating the switching circuit 340, and the control terminal 345 of the first switching circuit is electrically coupled to a control circuit 325, such as a processor or PLD of the electronic device. The common terminal 441 of the switching circuit 440 is electrically coupled to the second output terminal 318 of the filter circuit, the NO terminal 442 is electrically coupled to the second device input terminal 324, and the NC terminal 443 is electrically coupled to the NC terminal 343 of the first switching circuit 340 through the resistor 630. The voltage supply terminal 444 of the switching circuit 440 is again electrically coupled to a suitable voltage source capable of actuating the switching circuit 440, and the control terminal 445 of the switching circuit 440 is electrically coupled to the control circuit 325, such as a processor or PLD of the electronic device. As with the previously described embodiments, it should be appreciated that depending on the capabilities of the control circuit 325 and the requirements of the switching circuits 340, 440, the switching circuits 340, 440 may be electrically coupled to the control circuit 325 via a respective relay drive circuit (not shown).

As in described previously, the control circuit 325 monitors the line voltage sources on the first and second line input terminals 302, 304 or the first and second output terminals 316, 318 of the filter circuit and asserts either a first control voltage or a second control voltage that is received by terminals 345 and 445. During normal operation (e.g., where the electronic device is operatively coupled to a power source) and the line voltage sources are within a normal operating range, the control circuit 325 asserts the first control voltage that energizes each of the switching circuits 340, 440 and electrically couples the common terminal 341 to the NO terminal 342 of the first switching circuit 340 and the common terminal 441 to the NO terminal 442 of second switching circuit 440. In this first state in which the common terminal 341 is electrically coupled to NO terminal 342 and common terminal 441 is electrically coupled to the NO terminal 442, the resistor 630 is electrically disconnected and dissipates no power. Alternatively, when the electronic device 600 is disconnected from a source of power, the control circuit 325 detects a DC component, or a deviation from the expected waveform, and asserts the second voltage that de-energizes each of the switching circuits 340, 440 and electrically couples the common terminal 341 to the NC terminal 343 of the first switching circuit 340 and the common terminal 441 to the NC terminal 443 of the second switching circuit 440. In this second state, the resistor 630 is placed in parallel with the input capacitance (i.e., the first capacitor 313 and the second capacitor 315) and discharges the input capacitance within the certain period of time defined by the standards.

As in the embodiments described previously with respect to FIGS. 3a, 3b, 4a, 4b, 5a, and 5b, the switching circuits 340 and 440 may be configured differently with no loss in functionality. As such variations have been previously described with respect to these figures, a detailed description of such alternative configurations is omitted with respect to the embodiment of FIG. 6. As in the embodiment described above with respect to FIGS. 5a and 5b, one of ordinary skill in the art will appreciate that the switching circuits 340,440 need not be controlled by the same control signal, as separate control signals may be used.

It should be appreciated that like the embodiments depicted in FIGS. 3a and 3b, 4a and 4b, and 5a and 5b, the embodiment described above with respect to FIG. 6 permits any energy stored by the capacitors of the filter circuit 310 of the electronic device 600 to be discharged to a safe energy level within the time period proscribed by the various regulatory standards upon disconnection from a power source, while not wasting energy during normal operation of the electronic device. Moreover, where the electronic device 600 is a UPS that includes a back-feed protection or input switch or relay, such as a Form C relay, electrically coupled in series between a respective input terminal and a corresponding device input terminal, this functionality may be provided with minimal cost and complexity. Indeed, where the electronic device is a UPS that already includes Form C relays for feed-back protection or input switching, this functionality requires no additional components relative to the conventional circuit illustrated in FIG. 1, and where existing designs include a different type of back-feed protection or input switch, such as a single throw (e.g., single pole, single throw) relay, such existing designs may be readily modified to use a single pole double throw type switch, such as a Form C relay at minimal cost.

Figure 7:
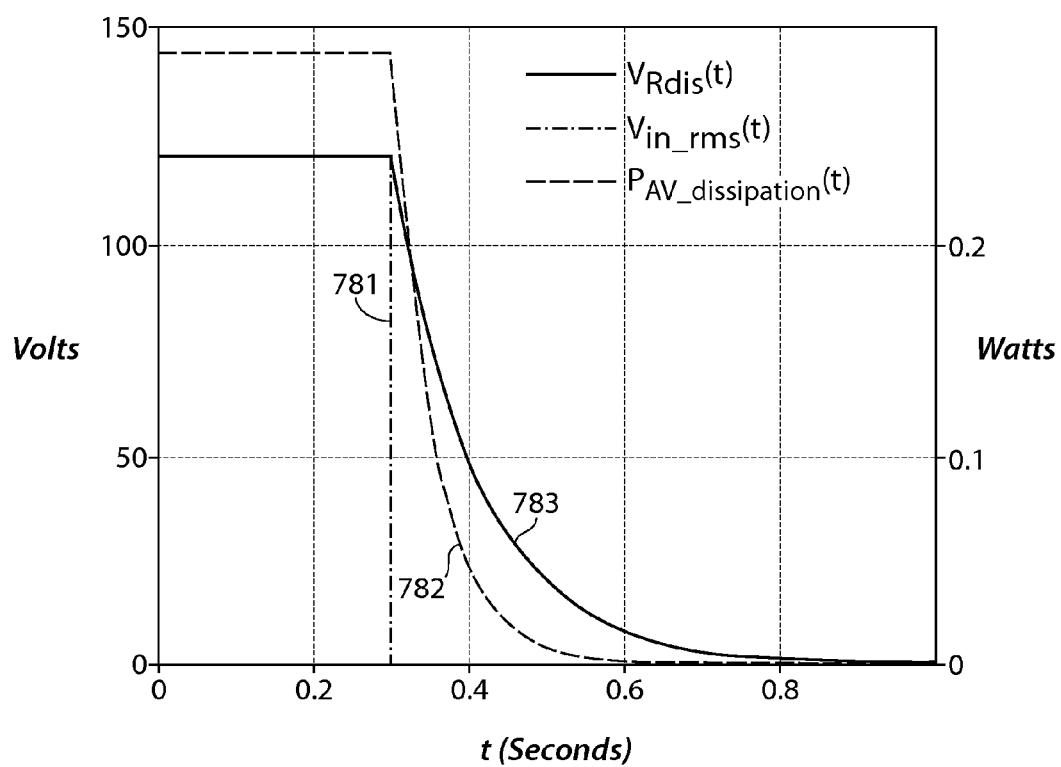
FIG. 7 is a waveform diagram illustrating the voltage and power characteristics over time for a conventional electronic device, such as described with respect to FIG. 1.

FIG. 7 is a waveform diagram illustrating the voltage and power characteristics over time for a conventional approach used to dissipate energy, such as described previously with respect to FIG. 1. In FIG. 7, the solid line 783 corresponds to the voltage across the resistor 130, the dashed line 782 corresponds to the average power dissipated by the resistor 130, and the dotted and dashed line 781 corresponds to the input voltage received on the first line input terminal 102. As shown in FIG. 7, a nominal input voltage of approximately 120Vrms is present until time (t)=0.3 s (300 ms), whereupon the input terminals of the input cable of the electronic device 100 are disconnected from the source of power, and the input voltage goes to 0V. Prior to this time, the resistor 130 dissipates a constant amount of power, with the voltage across the resistor 130 being about 120V. After time (t)=0.3 s (300 ms), both the average power dissipated by the resistor 130 and the voltage across the resistor 130 decrease asymptotically to zero within about 0.6 s and about 0.8 s, respectively.

Figure 8:
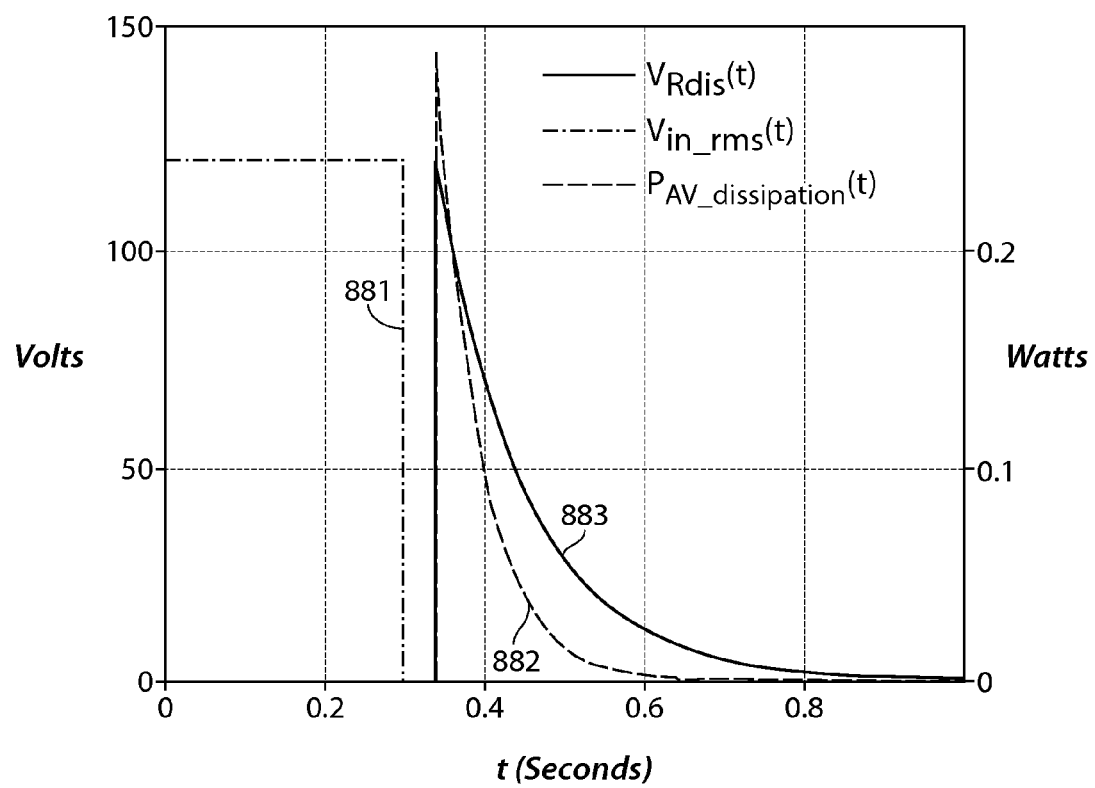
FIG. 8 is a waveform diagram illustrating the voltage and power characteristics over time for a conventional electronic device, such as described with respect to FIG. 2, and for an electronic device such as described with respect to FIGS. 3a, 3b, 4a, 4b, 5a, 5b and 6.

FIG. 8 is a waveform diagram modeling the voltage and power characteristics over time for both a conventional approach used to dissipate energy following disconnection from a power source while mitigating wasted energy during normal operation, such as described previously with respect to FIG. 2, and for the embodiments of the present invention described with respect to FIGS. 3a, 3b, 4a, 4b, 5a, 5b, and 6. In FIG. 8, the solid line 883 again corresponds to the voltage across the resistors 231, 232 (FIG. 2) or the voltage across resistor 330, 430, or 630 (FIGS. 3a and 3b, 4a and 4b, and 6) or across the resistors 330 and 340 (FIGS. 5a and 5b), the dashed line 882 corresponds to the average power dissipated by the respective resistor(s), and the dotted and dashed line 881 corresponds to the input voltage received on the first line input terminal 102 or 302.

As in FIG. 7, a nominal input voltage of approximately 120 Vrms is present until time (t)=0.3 s (300 ms), whereupon the input terminals of the input cable of the electronic device are disconnected from the source of power, and the input voltage goes to 0V. Prior to this time, none of the resistors 231 and 232, 330, 340, 630 or resistors 330 and 430 dissipate any power, and thus the voltage across these resistors and the average power dissipated by these resistors is zero. After time (t)=0.3 s (300 ms), there is a small amount of time that elapses during which a control circuit determines that the input terminals of the electronic device have been disconnected from the source of power. For the electronic device 200 of FIG. 2, after detecting the loss of input power, the bilateral switches 233, 234 are turned on, and the average power dissipated by the resistors 231, 232 and the voltage across those resistors nearly instantaneously rises and then decreases asymptotically to zero within about 0.6 s and about 0.8 s, respectively. For the electronic devices 300, 400, 500, and 600 of FIGS. 3a and 3b, 4a and 4b, 5a and 5b, and 6, the result is similar. After time (t)=0.3 s (300 ms), there is a small amount of time that elapses during which the control circuit 325 determines that the input terminals of the electronic device have been disconnected from the source of power, after which one or both of the switching circuits 340, 440 is (are) de-energized and the resistor 330, 430, 630, or resistors 330 and 340 are placed in parallel with the input capacitance. Once operatively coupled in parallel with the input capacitance, the average power dissipated by the resistors 330, 430, 630, or 330 and 430 and the voltage across those resistors nearly instantaneously rises and then decreases asymptotically to zero within about 0.6 s and about 0.8 s, respectively. Thus, as illustrated in FIG. 8, embodiments of the present invention have similar performance to the conventional solution previously described with respect to FIG. 2, but require little in the way of additional components, complexity, or cost.

Although aspects and embodiments of the present invention have been described primarily in terms of an electronic device, such as a UPS, it should be appreciated that aspects of the present invention may be used with other types of electronic devices that include a capacitance that is to be discharged upon disconnection from a power source. Where the electronic device already includes one or more switching devices, such as in a UPS, an electronic charger device, a switched mode power supply, etc., the ability to discharge the capacitance without wasting energy during normal operation can be realized with little or no additional cost and complexity.

Having thus described several aspects of at least one embodiment of this invention, it is to be appreciated various alterations, modifications, and improvements will readily occur to those skilled in the art. For example, although embodiments of the present invention have been primarily described in terms of an electronic device that is to be operatively coupled to a single phase power source, or a dual phase power source, embodiments of the present invention may be adapted for use with a three phase power source, or any multi-phase power source. Such alterations, modifications, and improvements are intended to be part of this disclosure, and are intended to be within the scope of the invention. Accordingly, the foregoing description and drawings are by way of example only.

What is claimed is:

1. An electronic device comprising:
a first line input and a second line input;
a first device input and a second device input;
a filter circuit having a first input electrically coupled to the first line input, a second input electrically coupled to the second line input, a first output electrically coupled to the first device input, and a second output, the filter circuit including at least one capacitor electrically coupling at least one of the first input of the filter circuit to the second input of the filter circuit or the first output of the filter circuit to the second output of the filter circuit; and
a switching circuit having a control input to receive a control signal having one of a first state and a second state, the switching circuit being configured to electrically couple the second output of the filter circuit to the second device input in response to the control signal having the first state and to electrically couple the second output of the filter circuit to one of the first input of the filter circuit and the first output of the filter circuit through a resistor in response to the control signal having the second state.

2. The electronic device of claim 1, wherein the switching circuit includes a relay having a control terminal to receive the control signal, a common terminal electrically coupled to the second output of the filter circuit, a normally open terminal electrically coupled to the second device input, and a normally closed terminal electrically coupled to the resistor.

3. The electronic device of claim 2, wherein the switching circuit is a first switching circuit, the electronic device further comprising:
a second switching circuit that electrically couples the first output of the filter circuit to the first device input.

4. The electronic device of claim 2, wherein the switching circuit is a first switching circuit and the resistor is a first resistor, the electronic device further comprising:
a second switching circuit having a control input to receive the control signal, the second switching circuit being configured to electrically couple the first output of the filter circuit to the first device input in response to the control signal having the first state and to electrically couple the first output of the filter circuit to the second input of the filter circuit through a second resistor in response to the control signal having the second state.

5. The electronic device of claim 4, wherein the relay is a first relay, and wherein the second switching circuit includes a second relay having a control terminal to receive the control signal, a common terminal electrically coupled to the first output of the filter circuit, a normally open terminal electrically coupled to the first device input, and a normally closed terminal electrically coupled to the second resistor.

6. The electronic device of claim 2, wherein the switching circuit is a first switching circuit, the electronic device further comprising:
a second switching circuit having a control input to receive the control signal, the second switching circuit being configured to electrically couple the first output of the filter circuit to the first device input in response to the control signal having the first state and to electrically couple the first output of the filter circuit to the second output of the filter circuit through the resistor in response to the control signal having the second state.

7. The electronic device of claim 6, wherein the relay is a first relay, and wherein the second switching circuit includes a second relay having a control terminal to receive the control signal, a common terminal electrically coupled to the first output terminal of the filter circuit, a normally open terminal electrically coupled to the first device input terminal, and a normally closed terminal electrically coupled to the resistor.

8. The electronic device of claim 1, wherein the switching circuit is a first switching circuit, the electronic device further comprising:
a second switching circuit that electrically couples the first output of the filter circuit to the first device input.

9. The electronic device of claim 1, wherein the switching circuit is further configured to electrically decouple the second output of the filter circuit from the second device input in response to the control signal having the second state.

10. The electronic device of claim 1, further comprising:
a control circuit to monitor line voltages received on the first line input and the second line input, the control circuit being configured to provide the control signal having the first state in response to the line voltages received on the first line input and the second line input being within a normal operating range of the electronic device and to provide the control signal having the second state in response to the line voltages received on the first line input and the second line input being outside the normal operating range of the electronic device.

11. The electronic device of claim 10, wherein the electronic device is an uninterruptable power supply.

12. The electronic device of claim 11, wherein the first line input is configured to be electrically coupled to a first phase of power and wherein the second line input is configured to be electrically coupled to one of a second phase of power, a neutral phase of power, and a ground reference.

13. The electronic device of claim 1, wherein the at least one capacitor electrically couples the first output of the filter circuit to the second output of the filter circuit.

14. A method of operating an electronic device comprising acts of:
monitoring line voltages received on first and second line inputs of the electronic device to determine whether the line voltages are within an operating range of the electronic device;
closing at least one switching circuit to electrically couple the line voltages to the electronic device in response to a determination that the line voltages are within the operating range of the electronic device;
filtering any electro magnetic interference present on the first and second line inputs using at least one capacitor electrically coupled between the first and second line inputs;
opening the at least one switching circuit to electrically decouple the line voltages from the electronic device in response to a determination that the line voltages are not within the operating range of the electronic device; and
electrically coupling at least one resistor in parallel with the at least one capacitor to discharge the at least one capacitor in response to the act of opening the at least one switching circuit.

15. The method of claim 14, wherein the at least one switching circuit includes a first switching circuit positioned between the first line input and a first device input of the electronic device and a second switching circuit positioned between the second line input and a second device input of the electronic device, and wherein the act of closing the at least one switching circuit includes acts of:
closing the first switching circuit to electrically couple the first line input to the first device input; and
closing the second switching circuit to electrically couple the second line input to the second device input.

16. The method of claim 15, wherein the act of opening the at least one switching circuit includes acts of:
opening the first switching circuit to electrically decouple the first line input from the first device input; and
opening the second switching circuit to electrically decouple the second line input from the second device input.

17. The method of claim 16, wherein the act of electrically coupling includes acts of:
electrically coupling a first resistor in parallel with the at least one capacitor to discharge the at least one capacitor in response to the act of opening the first switching circuit; and
electrically coupling a second resistor in parallel with the at least one capacitor to discharge the at least one capacitor in response to the act of opening the second switching circuit.

18. The method of claim 16, wherein the act of electrically coupling includes an act of electrically coupling the at least one resistor in parallel with the at least one capacitor to discharge the at least one capacitor in response to the acts of opening the first switching circuit and opening the second switching circuit.

19. The method of claim 14, further comprising acts of:
generating a control signal having a first state operable to close the at least one switching circuit in response to the determination that the line voltages are within the operating range of the electronic device; and
generating the control signal having a second state operable to open the at least one switching circuit in response to the determination that the line voltages are not within the operating range of the electronic device.

20. An electronic device comprising:
a first line input and a second line input;
a first device input and a second device input;
a filter circuit having a first input electrically coupled to the first line input, a second input electrically coupled to the second line input, a first output electrically coupled to the first device input, and a second output, the filter circuit including at least one capacitor electrically coupling at least one of the first input of the filter circuit to the second input of the filter circuit or the first output of the filter circuit to the second output of the filter circuit; and
means for electrically coupling the second output of the filter circuit to the second device input in a first state and for electrically coupling the second output of the filter circuit to one of the first input of the filter circuit and the first output of the filter circuit through a resistor in a second state.

21. The electronic device of claim 20, wherein the means for electrically coupling electrically decouples the second output of the filter circuit from the second device input in the second state.

* * * * *